(12) United States Patent
Bai et al.

(10) Patent No.: US 12,105,242 B2
(45) Date of Patent: Oct. 1, 2024

(54) EVALUATING ANISOTROPIC EFFECTIVE PERMEABILITY IN ROCK FORMATIONS HAVING NATURAL FRACTURE NETWORKS

(71) Applicant: Halliburton Energy Services, Inc., Houston, TX (US)

(72) Inventors: Jie Bai, Katy, TX (US); Vladimir Nikolayevich Martysevich, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 571 days.

(21) Appl. No.: 17/298,734

(22) PCT Filed: Jan. 25, 2019

(86) PCT No.: PCT/US2019/015152
§ 371 (c)(1),
(2) Date: Jun. 1, 2021

(87) PCT Pub. No.: WO2020/153972
PCT Pub. Date: Jul. 30, 2020

(65) Prior Publication Data
US 2022/0050224 A1     Feb. 17, 2022

(51) Int. Cl.
*G06F 30/20*     (2020.01)
*G01V 20/00*     (2024.01)
*G06F 111/10*    (2020.01)
*G06F 113/08*    (2020.01)

(52) U.S. Cl.
CPC .............. *G01V 20/00* (2024.01); *G06F 30/20* (2020.01); *G06F 2111/10* (2020.01); *G06F 2113/08* (2020.01)

(58) Field of Classification Search
CPC .. G01V 20/00; G01V 2210/626; G01V 11/00; G01V 1/50; G01V 2210/6246; G01V 2210/646; G06F 30/20; G06F 2111/10; G06F 2113/08
See application file for complete search history.

(56) References Cited

U.S. PATENT DOCUMENTS

| 9,507,047 B1 | 11/2016 | Dvorkin et al. |
| 2013/0238304 A1 | 9/2013 | Glinsky |
| 2017/0145793 A1* | 5/2017 | Ouenes ................... G06F 17/18 |

(Continued)

FOREIGN PATENT DOCUMENTS

| CN | 105683495 A | * | 6/2016 | ........... G06Q 10/067 |
| CN | 108227032 A | * | 6/2018 | ............... G01V 9/00 |
| FR | 3036518 A1 | * | 11/2016 | ............. G01V 99/00 |

(Continued)

OTHER PUBLICATIONS

Biot, "General Theory of Three Dimensional Consolidation," Journal of Applied Physics, vol. 12, No. 2, Feb. 1941, pp. 155-164.

(Continued)

*Primary Examiner* — Kandasamy Thangavelu
(74) *Attorney, Agent, or Firm* — NOVAK DRUCE CARROLL LLP

(57) ABSTRACT

A fracture simulation system is provided to determine anisotropic effective permeability of rock formations having natural fractures therein.

18 Claims, 5 Drawing Sheets

(56) References Cited

U.S. PATENT DOCUMENTS

2018/0348396 A1    12/2018    Hou

FOREIGN PATENT DOCUMENTS

| WO | WO 2014121270 A2 * | 8/2014 | ............. E21B 43/26 |
| WO | WO 2017131825 A1 * | 8/2017 | ............... G01V 3/38 |

OTHER PUBLICATIONS

Decroux et al., "Computation of Effective Dynamic Properties of Naturally Fractured Reservoirs: Comparison and Validation of Methods," In: EAGE Annual Conference & Exhibition Incorporating SPE Europec. Seciety of Petroleum Engineers, Jun. 13, 2013, pp. 1-92.

International Search Report and The Written Opinion of the International Search Authority, Oct. 24, 2019, PCT/US2019/015152, 9 pages, ISA/KR.

Oda, "Permeability Tensor for Discontinuous Rock Masses," Geotechnique, vol. 35, Issue 4, Dec. 1985, pp. 483-495.

Snow, "Anisotropic Permeability of Fractured Media," Water Resources Research, vol. 5, No. 6, Dec. 1969.

Terzaghi, "Die Berechnung der Durchlassigkeitsziffer des Tones aus Dem Verlauf der Hidrodynamichen Span-nungserscheinungen Akademie der Wissenschaften in Wien," Mathematish-Naturwissen-Schaftiliche Klasse, vol. 132, 1923, pp. 125-138.

Wang et al., "A Multiscale Multi-Permeability Poroplasticity Model Linked by Recursive Homogenizations and Deep Learning," Computer Methods in Applied Mechanics and Engineering, Feb. 10, 2018, vol. 334, pp. 337-380.

Wen, et al., "Use of Border Regions for Improved Permeability Upscaling," Mathematical Geology, vol. 35, No. 5, Jul. 2003, pp. 521-547.

Zhang et al., "The Use of Effective Medium Theories for Seismic Wave Propagation and Fluid Flow in Fractured Reservoirs Under Applied Stresses," Geophysical Journal International, vol. 177, Issue 1, Apr. 2009, pp. 205-221.

\* cited by examiner

EVALUATING ANISOTROPIC EFFECTIVE PERMEABILITY IN ROCK FORMATIONS HAVING NATURAL FRACTURE NETWORKS

PRIORITY

The present application is a U.S. National Stage patent application of International Patent Application No. PCT/US2019/015152, filed on Jan. 25, 2019, the benefit of which is claimed and the disclosure of which is incorporated herein by reference in its entirety.

FIELD OF THE DISCLOSURE

The present disclosure relates generally to hydrocarbon reservoir modeling and, more specifically, to a reservoir simulation system to determine the anisotropic effective permeability of a hydrocarbon-bearing reservoir having natural fractures therein.

BACKGROUND

In the oil and gas industry, reservoir modeling involves the construction of a computer model of a petroleum reservoir for the purpose of improving estimation of reserves and making decisions regarding the development of the field. For example, geological models may be created to provide a static description of the reservoir prior to production. In contrast, reservoir simulation models may be created to simulate the flow of fluids within the reservoir over its production lifetime. With reservoir simulation models, the modeling of fractures within a reservoir can present a challenge, requiring a thorough understanding of matrix flow characteristics, fracture network connectivity, and fracture-matrix interaction. Fractures can be described as open cracks or voids within the formation and can either be naturally occurring or artificially generated from a wellbore.

Natural fractures can have a huge impact on production from a conventional or unconventional reservoir. Since natural fractures can influence the effectiveness of a hydraulic fracture, as well as well productivity and connectivity between wells, simulating those scenarios is very important for asset teams trying to make good decisions in exploration and production of shale reservoirs. Examples of these decisions are reserves estimation, field planning (for primary, secondary, or tertiary recovery), completion optimization, well-spacing optimization, surface facilities optimization, and so on.

The reservoir rock formations are often assumed to be homogeneous and isotropic because of the simplicity or lack of reservoir rock formation data. Although the height heterogeneities are sometimes considered when image logs are available, the rock properties within the underground horizontal planes are still assumed to be homogeneous and isotropic. However, in reality the rock formation is never homogeneous and isotropic, even in same horizontal plane or within same formation layer, because of rock lithology, pore structures, micro and natural fractures networks ("NFNs"). The understanding of rock properties can significantly impact well drilling, completion design, and eventually the economic value of well. When estimating the production for given wells especially, the rock formation effective permeability also plays a critical role in obtaining accurate production forecasts.

DESCRIPTION OF ILLUSTRATIVE EMBODIMENTS

Figure 1:
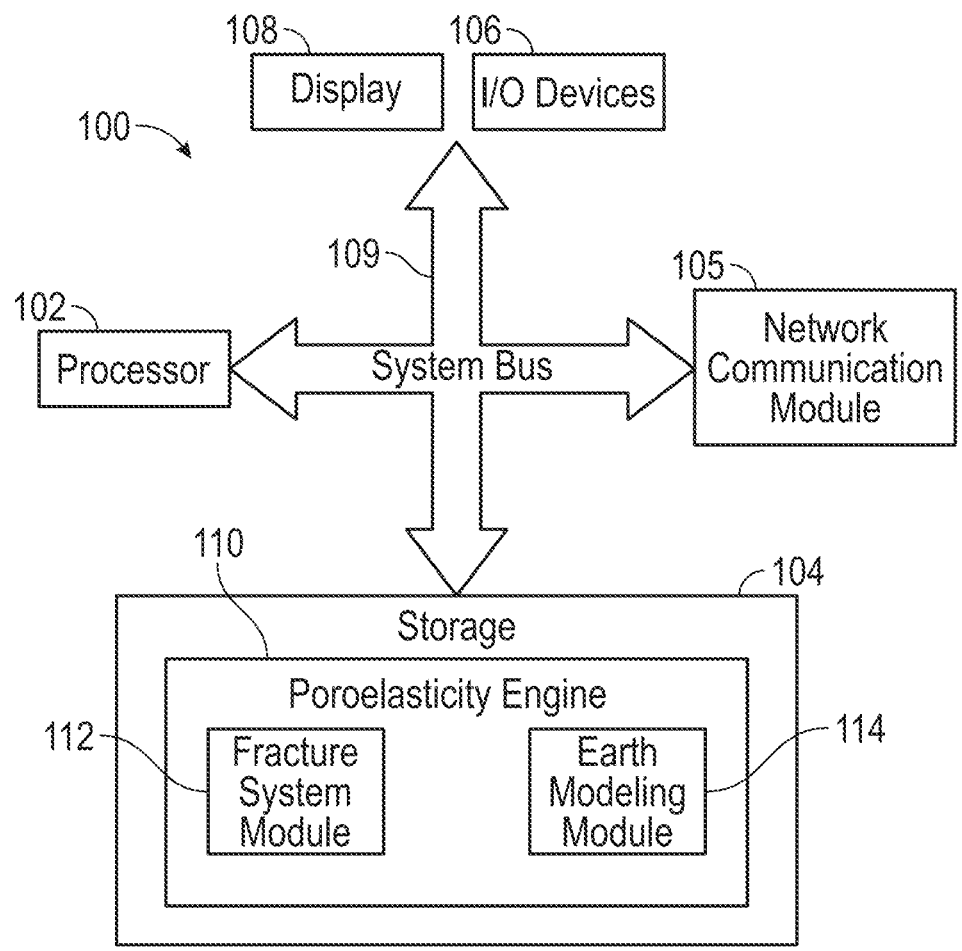
FIG. 1 shows a block diagram of a fracture network simulation system 100 according to certain illustrative embodiments of the present disclosure.

Illustrative embodiments and related methods of the present disclosure are described below as they might be employed in a reservoir simulator and method to determine anisotropic effective permeability of a rock formation in the presence of pre-existing NFNs. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As will be described below, illustrative methods and embodiments of the present disclosure apply computer simulations determine anisotropic effective permeability of rock formations having natural fractures therein. Anisotropic effective permeability is the ability of reservoir rock to allow fluids to flow differently through its pores depending on the flow directions. The system applies the formation data to determine how to distribute the fractures within the NFN. The NFN is a computerized representation of cells composed of fractures that can be highly heterogeneous with respect to their spatial location, shape, and physical dimensions and properties. Several software applications, many of them commercially available (e.g., DecisionSpace® NFN), can be used to generate discrete representation of these networks. Typically, in these applications, stochastic algorithms are used because of the high degree of uncertainty associated with subsurface fracture characterization. Sometimes, fracture characterization studies performed on surface outcrops are used as analogues from which inputs are provided to the NFN generation software applications. The NFN generation software make it possible to generate and visualize multiple realizations of fracture networks in the same software used to visualize subsurface geological and geophysical (G&G) data typically as part of a shared earth model. Visualization itself is useful for enhancing geological understanding in a naturally fractured reservoir, but a much more impactful use of the generated NFNs is to use them in reservoir simulation models to quantify their effect on fluid flow and hence well productivity in naturally fractured reservoirs.

Once generated, a generalized method of the present disclosure applies a poroelasticity model of the rock formation to simulate reservoir fluid flow and rock deformation of the rock formation. In addition, the poroelasticity model is used to simulate fluid flow within fractures of the NFN and fluid exchange between the NFN and rock formation. A pressure depletion profile of the rock formation is then obtained using the simulation. Thereafter, the pressure depletion profile is used to determine the anisotropic effective permeability of the rock formation.

FIG. 1 shows a block diagram of a fracture network simulation system 100 according to certain illustrative embodiments of the present disclosure. Fracture network simulation system 100 includes at least one processor 102, a non-transitory, computer-readable storage 104, transceiver/network communication module 105, optional I/O devices 106, and an optional display 108 (e.g., user interface), all interconnected via a system bus 109. Software instructions executable by the processor 102 for implementing software instructions stored within poroelasticity engine 110 in accordance with the illustrative embodiments and methods described herein, may be stored in storage 104 or some other computer-readable medium. Although not explicitly shown in FIG. 1, it will be recognized that fracture network simulation system 100 may be connected to one or more public and/or private networks via one or more appropriate network connections. It will also be recognized that the software instructions comprising poroelasticity engine 110 may also be loaded into storage 104 from appropriate storage media (e.g. a portable memory/hard drive, a CD-ROM, or the like) via wired or wireless methods.

Moreover, those ordinarily skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Still referring to FIG. 1, in certain illustrative embodiments, poroelasticity engine 110 comprises fracture system module 112 and earth modeling module 114. Fracture system module 112 provides the geometric definition of the natural fracture network, along with the petrophysical and mechanical property distributions for the fractures, as would be understood by those ordinarily skilled in the art having the benefit of this disclosure. An illustrative fracture system module may be, for example, the Fracpro® or Gohfer® platforms.

Still referring to the illustrative embodiment of FIG. 1, poroelasticity engine 110 also includes earth modeling module 114 to integrate with the fracture data contained within fracture system module 112 in order to provide subsurface stratigraphic visualization of the fractures and reservoir including, for example, geo science interpretation, petroleum system modeling, geochemical analysis, stratigraphic gridding, facies, net cell volume, and petrophysical property modeling. In addition, earth modeling module 114 models well paths, as well as cross-sectional through the facies and porosity data. Illustrative earth modeling platforms include DecisionSpace®, which is a commercially available software application developed and marketed by Landmark Graphics Corporation of Houston, Texas. However, those ordinarily skilled in the art having the benefit of this disclosure realize a variety of other earth modeling platforms or set of software applications may also be utilized with the present disclosure.

Poroelasticity simulation engine 110 may also include processing circuitry to enable robust data retrieval and integration of historical and real-time reservoir related data that spans across all aspects of the well planning, construction and completion processes such as, for example, drilling, cementing, wireline logging, well testing and stimulation. Moreover, such data may include, for example, logging data, well trajectories, petrophysical rock property data, mechanical rock property data, surface data, fault data, data from surrounding wells, data inferred from geostatistics, etc. The database (not shown) which stores this information may reside within fracture system module 112 or at a remote location. An illustrative database platform is, for example, the INSITE® software suite, commercially offered through Halliburton Energy Services Inc. of Houston Texas Those ordinarily skilled in the art having the benefit of this disclosure realize there are a variety of software platforms and associated systems to retrieve, store and integrate the well related data, as described herein.

In addition, poroelasticity engine 110 may also include multi-domain workflow automation capabilities that may connect any variety of desired technical applications. As such, the output from one application, or module, may become the input for another, thus providing the capability to analyze how various changes impact the well placement and/or fracture design. Those ordinarily skilled in the art having the benefit of this disclosure realize there are a variety of workflow platforms which may be utilized for this purpose.

As generally described above, methods and embodiments of the present disclosure determine anisotropic effective permeability of a hydrocarbon-bearing rock formation. In illustrative methods described herein, the effective permeability could be isotropic or anisotropic, and it can be expressed as a permeability tensor in a general form as follows:

$$K = \begin{bmatrix} k_{xx} & k_{xy} & k_{xz} \\ k_{yx} & k_{yy} & k_{yz} \\ k_{zx} & k_{zy} & k_{zz} \end{bmatrix}. \qquad \text{Eq.(1)}$$

where k is the element of the permeability tensor with values depend on the orientation of the rock formation with respect to the coordinate system, and x, y, and z refer to orientations of the given coordinate system.

If the rock formation is truly isotropic in nature, it has the same permeability value regardless of given orientation. Thus, Equation 1 can be reduced to the following form:

$$K = \begin{bmatrix} k & 0 & 0 \\ 0 & k & 0 \\ 0 & 0 & k \end{bmatrix}. \qquad \text{Eq.(2)}$$

Anisotropic characterization of rock effective permeability will produce different depletion rates and zones in different directions, compared with the same depletion rates and zones for isotropic permeability. Determination of the anisotropic permeability for homogeneous and fractured media has attracted significant interest from many hydrogeologists and petroleum engineers. Those estimations will have significant impact on well spacing planning. The illustrative embodiments described herein determine anisotropic effective permeability and, more specifically, the effective permeability for underground horizontal planes.

Rock formation properties are primarily obtained through lab testing or formation testing. Lab testing is often limited by sample size and can only provide formation properties for intact rock, which are also often shown to be homogeneous and isotropic. Because those "perfect" samples don't have enough size to be representative for real rock formations that have micro or natural fractures, those measured properties cannot be utilized directly for field applications, especially the effective permeability for forecasting production. For field testing, there is no direct measurement which can be easily performed. In order to account for the effect of distributed fractures or fracture networks on formation effective permeability, correlations between fracture distribution and seismic data may be applied.

Seismic anisotropy can be used to determine the orientation of fractures. Such methods are described in, for example, Zhang, Y., Sayers, C. M. and Adachi, J. I., *The use of effective medium theories for seismic wave propagation and fluid flow in fractured reservoirs under applied stresses*, Geophysical Journal International (2009). The correlation (between anisotropy and fracture orientation is important in understanding the spatial variation of anisotropic permeability in fractured reservoirs. As described herein, once fracture orientation, density, and spatial variation are determined, fluid flow modeling through those connected fracture network can be performed. By modeling fluid flow through fracture network, the effective permeability can be determined.

Permeability tensors are required to model fluid flow in porous media. In mathematics, a tensor is an arbitrarily complex geometric object that maps in a multi-linear manner geometric vectors, scalars, and other tensors to a resulting tensor. Permeability tensors may be computed in a variety of ways. One such method includes an analytical means of superposition under the assumption of an impermeable rock matrix, as described in, for example, *Anisotropic Permeability of Fractured Media*, Water Res., 5(6), Snow, D. T. (1969). In order to account for the permeable rock matrix, an analytical superposition method based on geometric properties of the fracture network to compute the permeability tensor may be used, as described in e.g., *Permeability Tensor for Discontinuous Rock Masses*, Geotechnique, v.35, no. 4, Oda, A.(1985).

Permeability can be isotropic or anisotropic in nature depending on the direction and characterization of fractures. Analytical methods, however, have their limitations, such as (1) the rock matrix permeability is assumed to be impermeable or uniform and (2) fracture conductivity is assumed to be constant and fractures need to be connected to form fluid paths. As a result, permeability might be under-estimated.

The various analytical and numerical models described above have at least two major limitations. First, fractures need to be connected to form fracture networks and these models fail to account for such connections. Second, these models fail to account for the geomechanical effects on the rock formation. One such geomechanical effect is the rock formation stress states. Here, for example, these models assume the reservoir pore pressure change is purely due to the fluid flow within the fracture network, thus completely ignoring external stresses being applied to the fractures. Other geomechanical effects which are ignored are the rock matrix itself or fluid exchange between the fracture and rock matrix. In reality, however, the rock formation underground is always under tectonic stresses, and reservoir fluid pressure and formation stress affect each other constantly. Pore pressure changes will result in stress changes on fractures, and vice versa. Especially when fractures are present, stress changes will change the fracture behavior, such as fracture conductivity/permeability, and those stress changes will affect the fluid flow within fractures.

Accordingly, the illustrative methods described herein provide an improve model by which to determine the anisotropic effective permeability of naturally fractured rock formations. The theory regarding simultaneous deformation of porous material and the flow of the pore fluid may be extended to three dimensions and a poroelasticity model. To do so, in certain methods described herein, the effective stress on a rock formation is expressed as:

$$\sigma = C\varepsilon - \alpha p \qquad \text{Eq.(3)},$$

where $\sigma$ is effective stress tensor, C is the elasticity tensor of rock matrix, $\varepsilon$ is strain tensor, p is pore pressure, and $\alpha$ is Biot's coefficient representing the coupling between the stress and the pore pressure. Equation 3 is known as the poroelasticity model.

Building upon Equation 3, the present disclosure provides a novel simulation model for determining anisotropic effective permeability of rock formations with existing natural fractures (and NFNs). The described methods include three parts. First, a poroelasticity model (Eq. 3) is used to simulate reservoir fluid flow and rock deformation within a rock matrix, and rock stress states are evaluated along with pore pressure changes. Second, natural fractures are explicitly modeled, and fluid flow within those fractures are simulated using Darcy's law:

$$u = \frac{K}{\mu}\frac{\partial p}{\partial x}, \qquad \text{Eq.(4)}$$

where u is fluid velocity, $\mu$ is fluid viscosity, p is fluid pressure, and $\delta$ is the partial differential operator. K is permeability and may be expressed as a function of stress applied on the fracture surfaces as follows:

$$K = K(\sigma) \qquad \text{Eq.(5).},$$

where K ($\sigma$) is evaluated using updated stress Equation 3.

Third, the system then models the fluid exchange between natural fractures and the rock matrix using, for example, Darcy's Law. A pressure depletion profile of the rock formation/matrix is then obtained and used to determine the anisotropic effective permeability of the rock formation. This three-part methodology is described in greater detail below.

Figure 2:
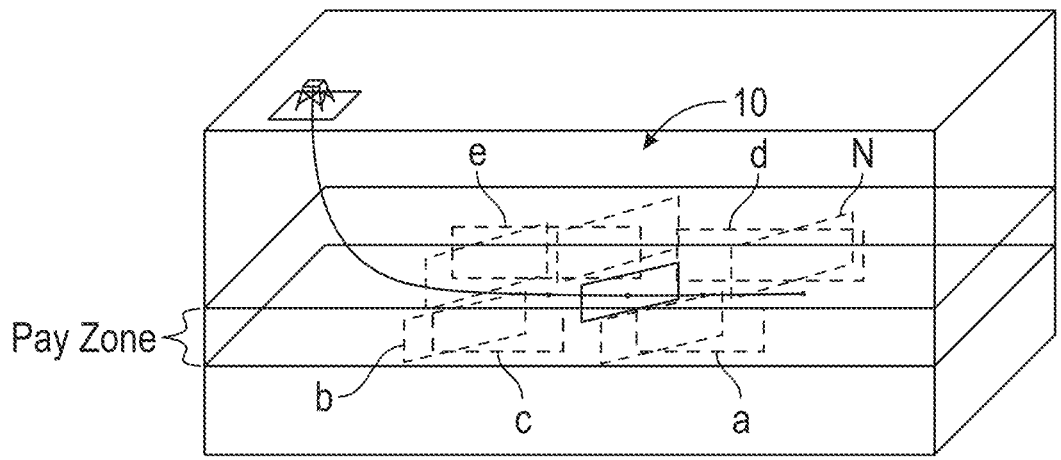
FIG. 2 shows a schematic plot of a horizontal wellbore passing through pay zone, according to certain illustrative methods of the present disclosure.

The illustrative models described herein take full account of fracture distribution and stress changes due to existing fracture networks. Fluid flow through fractured rock will vary heterogeneously throughout the rock matrix and will show significant difference between different orientations, and this phenomenon is used by the illustrative methods to characterize the anisotropic effective permeability. FIG. 2 shows a schematic plot of a horizontal wellbore passing through pay zone, according to certain illustrative methods of the present disclosure. The targeted pay zone has predetermined NFNs therein.

Figure 3A:
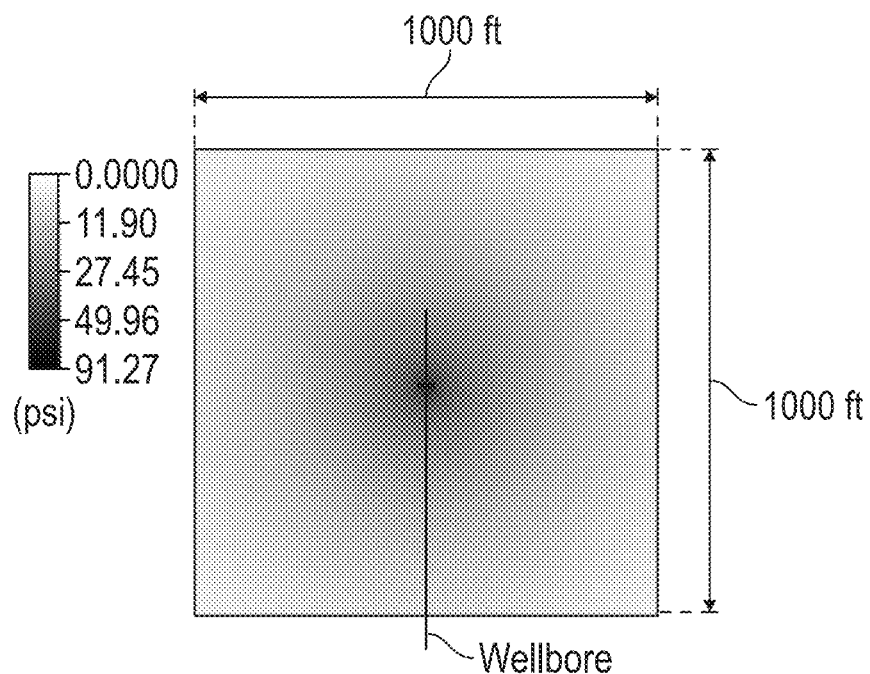
FIGS. 3A and 3B show depletion profile maps of the pay zone without and with natural fractures, respectively, according to certain illustrative methods of the present disclosure.
Figure 3B:
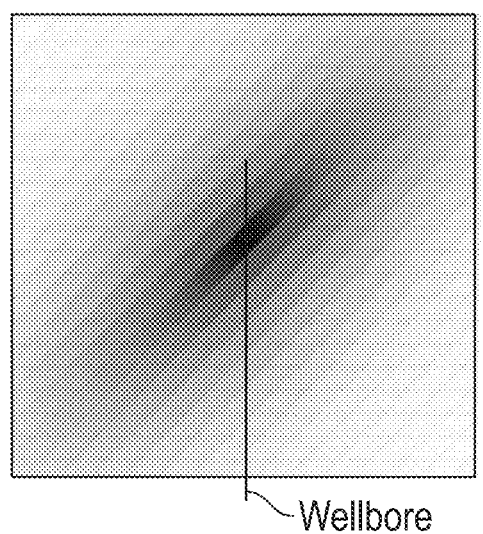

With reference to FIG. 2 and assuming vertical homogeneity, the illustrated pay zone with NFN 10 (having natural fractures a,b,c,d,e . . . N) will now be compared with the case where no NFN is present. FIG. 3A shows two-dimensions along the horizontal plane (a "2D depletion profile map) of the pay zone in FIG. 2 without natural fractures, while FIG. 3B shows a 2D depletion profile map of the pay zone with two NFNs. The depletion profile maps show the pore pressure change due to depletion. To generate the depletion profile maps, the well is put on production for a period of time. The system then calculates fluid flow inside fractures and the formation matrix, pore pressure, and stresses using Equation 3-5. Equations 3-5 are solved in an implicit manner. Once the solution is achieved, pore pressure is obtained throughout the computational domain and then the pore pressure depletion profile map is generated.

In the example of FIGS. 3A and 3B, the specified domain (or rock matrix) size is 1000 ft by 1000 ft. and vertical depth is 5000 ft. The two natural fracture families of FIG. 3B have a 45 degree difference in strike angle and have the same fracture spacing, but they have different permeability. Natural fracture strike angle and permeability are obtained from core sample analysis. The grey scale color in FIGS. 3A and 3B corresponds to pore pressure (in psi) change due to depletion (the darker the profile, the higher the pore pressure). As can be seen, the depleted zone is symmetric in FIG. 3A where there is no NFN. However, in FIG. 3B due to the presence of the NFNs, the depletion profile clearly shows the anisotropic characterization of the rock effective permeability, as one of its principal axes is following along the NFN having a 45 degree angle, even though the rock matrix permeability in general is isotropic and homogeneous. As such, one can see how the disclosed methods utilized NFNs to determine anisotropic effective permeability.

To generate the models in certain illustrative methods, the distribution of natural fractures within NFNs can be obtained using formation data, such as image log or seismic data. Image logs can provide information on natural fracture orientation and spacing along the wellbore trajectory, while seismic data can provide fracture orientation and location on larger formation domains away from the wellbore trajectory.

Unlike conventional methods for estimating the effective permeability, in certain methods described herein it is not necessary to connect individual fractures within NFNs because fluid exchange between the NFNs and the rock matrix is modeled. In conventional methods, fluid can only flow through connected fractures. If a fracture doesn't have any intersection with other fractures, it will not contribute the formation's overall ability to allow fluid flow, which may lead to underestimated permeability. In an extreme case, if all natural fractures don't intersect with each other, the permeability obtained using conventional methods will be the same as the matrix permeability, as if there is no natural fracture present. However, the methods described herein model all aspects of fluid flow, including fluid inside fracture, fluid exchange between fracture and matrix, and fluid flow inside matrix. When fractures are not connected, fluid still flows from fracture to matrix, then from matrix to another fracture which might not be directly connected to previous fractures.

Figure 4A:
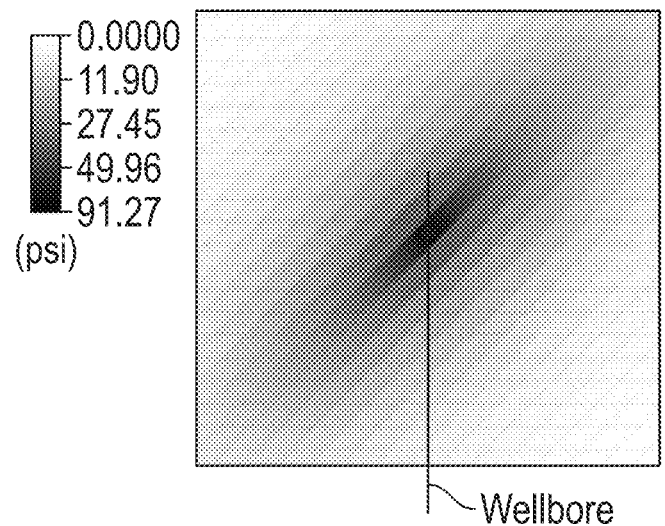
FIG. 4A shows a pressure depletion profile for a connected NFN, according to certain illustrative methods of the present disclosure.
Figure 4B:
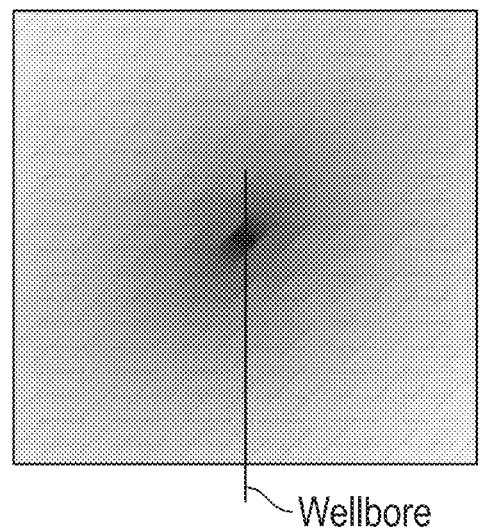
FIG. 4B shows a pressure depletion profile for a disconnected NFN, according to alternative methods of the present disclosure.

Thus, the described methods provide the necessary modeling with or without connected networks. To illustrate this, FIG. 4A shows a pressure depletion profile for a connected NFN, according to certain illustrative methods of the present disclosure. FIG. 4B shows a pressure depletion profile for a disconnected NFN, according to alternative methods of the present disclosure. The anisotropic effect can be seen as a 45 degree strike angle in both FIGS. 4A and 4B, although it is more pronounced in 4A. Thus, FIGS. 4A and 4B demonstrate the capability of the disclosed models for modeling connected or disconnected fracture networks.

Figure 5:
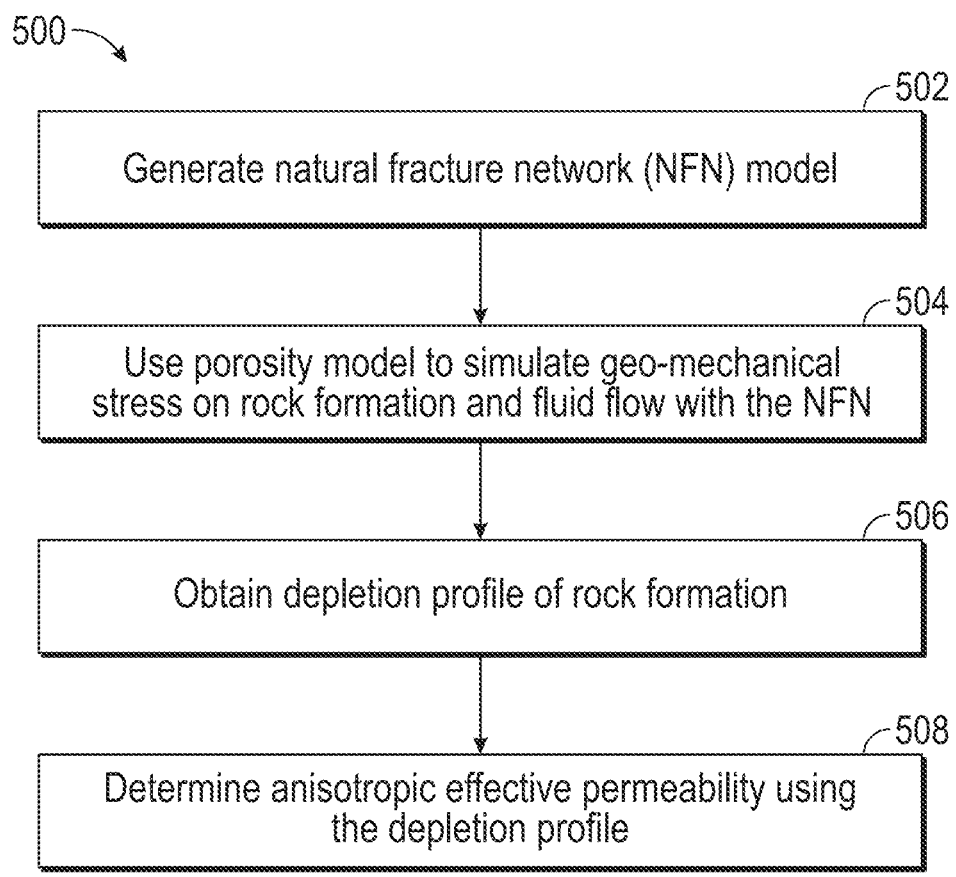
FIG. 5 is a flow chart of method to determine anisotropic effective permeability of a hydrocarbon-bearing rock formation, according to certain illustrative methods of the present disclosure.

FIG. 5 is a flow chart of method 500 to determine anisotropic effective permeability of a hydrocarbon-bearing rock formation, according to certain illustrative methods of the present disclosure. At block 502, fracture network simulation system 100 is initialized to generate a reservoir earth model (e.g., 3D geocellular grid) of a rock formation having a NFN therein. During initialization, poroelasticity engine 110 uploads formation data from fracture system module 112 and Earth Modeling module 114. Such data may include, for example, geocellular grid and fracture data obtained from image log or seismic data and used to determine the create the representative rock mass with fractures, and the distribution (e.g., density and orientation) of natural fractures and NFNs. The geometry for the input fractures may be provided in any number of ways, and may include analytic or discrete surface descriptions.

At block 504, fracture network simulation system 100 generates and applies the porosity model to simulate geomechanical stress on the rock formation and fluid flow within the NFNs. Equation 3 is the poroelasticity model and is applied by the system to perform this block. Rock formation samples are obtained from drilling core sample from this well or nearby wells and tested to determine the rock formation's permeability and conductivity. Using Equations 3-5, this data is then used to simulate reservoir fluid flow and deformation of the rock formation to determine the changes in the sampled formation's conductivity/permeability due to geo-mechanical stresses (e.g., tectonic stresses, reservoir fluid pressure, formation stress, etc.) acting on the rock formation. Simultaneously, the pressure depletion profiles (block 506) are also obtained. Examples of pressure depletion profiles are shown in FIGS. 3B-4B.

At block 508, fracture network simulation system 100 uses the pressure depletion profile to determine the anisotropic effective permeability of the rock formation. To do so, various methods may be used to calculate the anisotropic effective permeability tensor such as, for example, volume-averaged fluid flux or pressure gradient methods. Here, the fluid flux and pressure gradient are volume-averaged along major orientations in the given coordinate system, then Equation 4 is used to evaluate all permeability elements in the permeability tensor of Equation 1. For example, with respect to FIG. 3B, the anisotropic effective permeability is shown to have a principle orientation of 45 degree respect to horizontal axes. The resulting permeability data may be communicated to an operator in a variety of ways, such as, for example, graphically displayed as shown in FIG. 3B or displayed as a report.

The calculated anisotropic effective permeability may be utilized in a variety of applications, such as in a reservoir simulation. A primary and often unique application of reservoir simulation is in estimation of recoverable reserves in an oil and gas asset. The ability to create and simulate such models makes it possible to more accurately and in a timely manner predict productivity of a naturally fractured reservoir, both conventional and unconventional, whether of typical or very large size. Thereafter, the reservoir simulation may be utilized to plan the exploitation of a naturally-fractured oil and gas asset, in addition to drilling, completion and placement of the wellbore.

Figure 6:
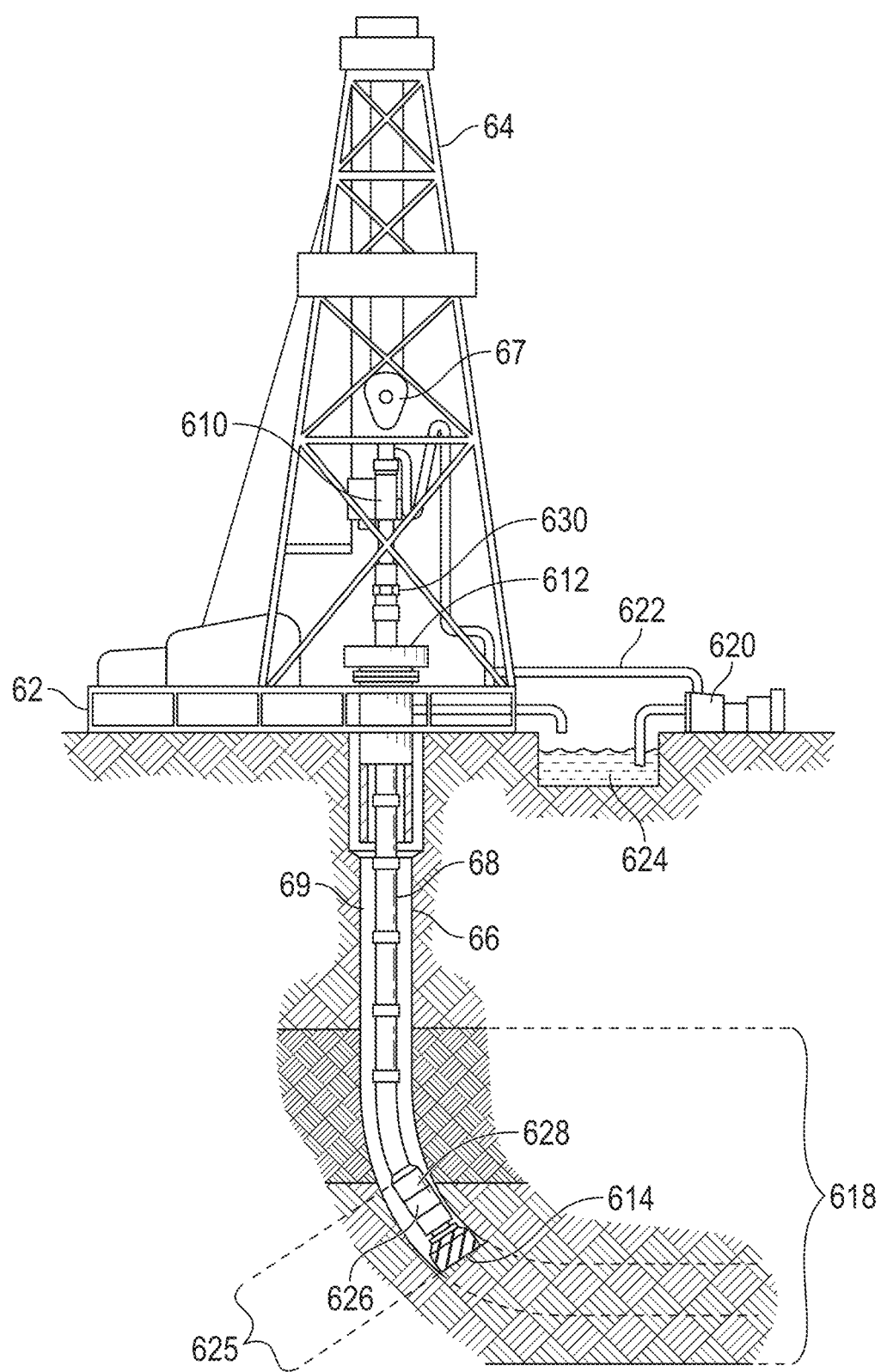
FIG. 6 shows an illustrative drilling application implemented based upon a well placement plan.

FIG. 6 shows an illustrative drilling application implemented based upon a well placement plan determined using the methods disclosed herein. In FIG. 6, a drilling platform 62 supports a derrick 64 having a traveling block 67 for raising and lowering a drill string 68. A drill string kelly 610 supports the rest of drill string 68 as it is lowered through rotary table 612. Rotary table 612 rotates drill string 68, thereby turning drill bit 614. As drill bit 614 rotates, it creates a borehole 617 that passes through various formations 618. A pump 620 circulates drilling fluid through feed pipe 622 to kelly 610, downhole through the interior of drill string 68, through orifices in drill bit 614, back to the surface via annulus 69 around drill string 68, and into a retention pit 624. The drilling fluid transports cuttings from borehole 66 into pit 624 and aids in maintaining the integrity of borehole 66.

Drill bit 614 is just one piece of an LWD assembly that includes one or more drill collars 626 and logging tool 628. Drill collars 626 are thick-walled steel pipe sections that provide weight and rigidity for the drilling process. Logging tool 628 (which may be built into one of the drill collars) gathers measurements of various drilling or formation parameters. Without limitation, logging tool 628 may be integrated into the bottom-hole assembly 625 near bit 614 to collect measurements. The collected measurements may be used to determine anisotropy effective permeability as described herein, plotted and used for steering the drill string 68 and/or to analyze formation properties.

Measurements from logging tool 628 can be acquired by a telemetry sub (e.g., integrated with logging tool 628) to be stored in internal memory and/or communicated to the surface via a communications link. Mud pulse telemetry is one common technique for providing a communications link for transferring logging measurements to a surface receiver 630 and for receiving commands from the surface, but other telemetry techniques can also be used. In certain illustrative embodiments, measurements collected from the logging tool 628 are processed by a computer system to produce one or more well logs for analysis. The contemplated logs include acoustic logging measurements such as, for example, the propagation velocities of compressional and shear waves, the received waveforms, and derivable values such as acoustic impedance.

Embodiments and methods described herein further relate to any one or more of the following paragraphs:

1. A computer-implemented method to determine anisotropic effective permeability of a hydrocarbon-bearing rock formation, the method comprising: using formation data to generate a model of a natural fracture network ("NFN") within a rock formation, wherein a distribution of fractures within the NFN is determined using the formation data; generating a poroelasticity model of the rock formation; using the poroelasticity model to simulate: reservoir fluid flow and rock deformation of the rock formation; fluid flow within fractures of the NFN; fluid exchange between the NFN and rock formation; and using the simulation to obtain a pressure depletion profile of the rock formation; and using the pressure depletion profile to determine the anisotropic effective permeability of the rock formation.

2. The method of paragraph 1, wherein the distribution of the natural fractures comprises a density or orientation of the natural fractures.

3. The method of paragraphs 1 or 2, wherein the poroelasticity model defines an effective stress tensor of the rock formation.

4. The method of any of paragraphs 1-3, wherein the effective stress tensor is calculated using an elasticity tensor of the rock formation, strain tensor of the rock formation, pore pressure of the rock formation, and a coefficient representing a coupling between effective stress and the pore pressure.

5. The method of any of paragraphs 1-4, wherein the poroelasticity model is used to simulate the fractures of the NFN as a function of effective stress applied to surfaces of the natural fractures.

6. The method of any of paragraphs 1-5, wherein the anisotropic effective permeability is used to plan, perform, or analyze a wellbore operation.

7. The method of any of paragraphs 1-6, wherein the anisotropic effective permeability is used to predict productivity of a well.

Furthermore, any of the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to determine anisotropic effective permeability of a hydrocarbon-bearing rock formation, the method comprising:
   using formation data to generate a model of a natural fracture network, NFN, within a rock formation, wherein a distribution of fractures within the NFN is determined using the formation data;
   generating a poroelasticity model of the rock formation;
   using the poroelasticity model applied based on the model of the natural fracture network to simulate:
      reservoir fluid flow and rock deformation of the rock formation;
      fluid flow within fractures of the NFN;
      fluid exchange between the NFN and the rock formation; and
   using the simulation to obtain a pressure depletion profile of the rock formation;
   using the pressure depletion profile to determine the anisotropic effective permeability of the rock formation; and
   using the anisotropic effective permeability to plan, perform, or analyze a wellbore operation.

2. The method of claim 1, wherein the distribution of the natural fractures comprises a density or orientation of the natural fractures.

3. The method of claim 1, wherein the poroelasticity model defines an effective stress tensor of the rock formation.

4. The method of claim 3, wherein the effective stress tensor is calculated using an elasticity tensor of the rock formation, strain tensor of the rock formation, pore pressure of the rock formation, and a coefficient representing a coupling between effective stress and the pore pressure.

5. The method of claim 1, wherein the poroelasticity model is used to simulate the fractures of the NFN as a function of effective stress applied to surfaces of the natural fractures.

6. The method of claim 1, wherein the anisotropic effective permeability is used to predict productivity of a well.

7. A non-transitory computer readable medium comprising instructions which, when executed by at least one processor, causes the processor to perform a method comprising:
   using formation data to generate a model of a natural fracture network, NFN, within a rock formation, wherein a distribution of fractures within the NFN is determined using the formation data;
   generating a poroelasticity model of the rock formation;
   using the poroelasticity model to simulate:
      reservoir fluid flow and rock deformation of the rock formation;
      fluid flow within fractures of the NFN;
      fluid exchange between the NFN and rock formation; and
   using the simulation to obtain a pressure depletion profile of the rock formation;
   using the pressure depletion profile to determine the anisotropic effective permeability of the rock formation; and
   using the anisotropic effective permeability to plan, perform, or analyze a wellbore operation.

8. The computer readable medium of claim 7, wherein the distribution of the natural fractures comprises a density or orientation of the natural fractures.

9. The computer readable medium of claim 7, wherein the poroelasticity model defines an effective stress tensor of the rock formation.

10. The computer readable medium of claim 9, wherein the effective stress tensor is calculated using an elasticity tensor of the rock formation, strain tensor of the rock formation, pore pressure of the rock formation, and a coefficient representing a coupling between effective stress and the pore pressure.

11. The computer readable medium of claim 7, wherein the poroelasticity model is used to simulate the fractures of the NFN as a function of effective stress applied to surfaces of the natural fractures.

12. The computer readable medium of claim 7, wherein the anisotropic effective permeability is used to predict productivity of a well.

13. A system comprising processing circuitry to perform a method comprising:
   using formation data to generate a model of a natural fracture network, NFN within a rock formation, wherein a distribution of fractures within the NFN is determined using the formation data;
   generating a poroelasticity model of the rock formation;
   using the poroelasticity model to simulate:
      reservoir fluid flow and rock deformation of the rock formation;
      fluid flow within fractures of the NFN;
      fluid exchange between the NFN and rock formation; and
   using the simulation to obtain a pressure depletion profile of the rock formation;
   using the pressure depletion profile to determine the anisotropic effective permeability of the rock formation; and
   using the anisotropic effective permeability to plan, perform, or analyze a wellbore operation.

14. The system of claim 13, wherein the distribution of the natural fractures comprises a density or orientation of the natural fractures.

15. The system of claim 13, wherein the poroelasticity model defines an effective stress tensor of the rock formation.

16. The system of claim 15, wherein the effective stress tensor is calculated using an elasticity tensor of the rock formation, strain tensor of the rock formation, pore pressure of the rock formation, and a coefficient representing a coupling between effective stress and the pore pressure.

17. The system of claim 13, wherein the poroelasticity model is used to simulate the fractures of the NFN as a function of effective stress applied to surfaces of the natural fractures.

18. The system of claim 13, wherein the anisotropic effective permeability is used to
   predict productivity of a well.

* * * * *